United States Patent
Nelms et al.

(10) Patent No.: US 11,836,709 B2
(45) Date of Patent: Dec. 5, 2023

(54) DIGITAL WALLET MANAGEMENT SYSTEM

(71) Applicant: Walmart Apollo, LLC, Bentonville, AR (US)

(72) Inventors: David Martin Nelms, Rogers, AR (US); Douglas Jahe Ryner, Cave Springs, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 387 days.

(21) Appl. No.: 16/179,029

(22) Filed: Nov. 2, 2018

(65) Prior Publication Data
US 2019/0197529 A1   Jun. 27, 2019

Related U.S. Application Data

(60) Provisional application No. 62/609,595, filed on Dec. 22, 2017.

(51) Int. Cl.
*G06Q 20/36* (2012.01)
*G06Q 20/22* (2012.01)

(52) U.S. Cl.
CPC ......... *G06Q 20/367* (2013.01); *G06Q 20/227* (2013.01); *G06Q 20/363* (2013.01)

(58) Field of Classification Search
CPC ...... G06Q 20/22; G06Q 20/227; G06Q 20/36; G06Q 20/363; G06Q 20/367; G06Q 20/20–209

(Continued)

(56) References Cited

U.S. PATENT DOCUMENTS 6,993,507 B2   1/2006   Krouse
8,380,177 B2   2/2013   Laracey
(Continued)

FOREIGN PATENT DOCUMENTS

WO   2017065735 A1   4/2017

OTHER PUBLICATIONS

Walmart Introduces Walmart Pay Pay with any iOS or Android smartphone, any major payment type and at any checkout lane—all through the Walmart app. Dec. 10, 2015 https://corporate.walmart.com/newsroom/2015/12/10/walmart-introduces-walmart-pay (Year: 2015).*

(Continued)

*Primary Examiner* — James D Nigh
(74) *Attorney, Agent, or Firm* — Fitch, Even, Tabin & Flannery LLP

(57) ABSTRACT

An example system for digital wallet management including one or more databases and a computing system is described. The databases are configured to store data corresponding to purchase history of a user, the purchase history including payment account information for a first transaction captured through a reader at a point-of-sale system at the time of the first transaction and an identifier associated with the first transaction. The computing system receives a machine-readable element having the identifier associated with the first transaction encoded therein, searches the databases to determine the payment account information associated with the identifier, generates a prompt requesting confirmation of adding the payment account information for the first transaction to a digital wallet, receives positive confirmation to the generated prompt, and populates the digital wallet with the payment account information.

16 Claims, 9 Drawing Sheets

(58) Field of Classification Search
USPC .......................................................... 705/65
See application file for complete search history.

(56) References Cited

U.S. PATENT DOCUMENTS

| | | | |
|---|---|---|---|
| 8,442,914 B2 | 5/2013 | Killian et al. | |
| 8,498,900 B1 | 7/2013 | Spirin | |
| 8,571,985 B1* | 10/2013 | Grigg | G06Q 20/36 |
| | | | 705/40 |
| 8,720,771 B2 | 5/2014 | Mackinnon Keith | |
| 8,924,292 B1* | 12/2014 | Ellis | G06Q 20/36 |
| | | | 705/41 |
| 8,939,360 B2 | 1/2015 | Grossman | |
| 9,208,488 B2 | 12/2015 | Liberty | |
| 9,342,828 B2 | 5/2016 | Sanchez | |
| 9,430,768 B2 | 8/2016 | Graylin et al. | |
| 9,589,266 B2 | 3/2017 | Pourfallah | |
| 10,192,210 B2* | 1/2019 | Baig | G07G 5/00 |
| 10,192,216 B2* | 1/2019 | Hammad | G06Q 20/353 |
| 10,664,819 B1 | 5/2020 | Zafar | |
| 2005/0127167 A1 | 6/2005 | Nakajima | |
| 2009/0204530 A1 | 8/2009 | Hanson | |
| 2009/0307140 A1 | 12/2009 | Mardikar | |
| 2010/0138344 A1 | 6/2010 | Wong | |
| 2010/0320266 A1 | 12/2010 | White | |
| 2011/0251892 A1 | 10/2011 | Laracey | |
| 2012/0205445 A1 | 8/2012 | Rothschild | |
| 2012/0209749 A1* | 8/2012 | Hammad | G06Q 20/326 |
| | | | 705/27.1 |
| 2012/0234911 A1* | 9/2012 | Yankovich | G06Q 20/3276 |
| | | | 705/41 |
| 2012/0253913 A1* | 10/2012 | Richard | G06Q 20/363 |
| | | | 705/14.27 |
| 2012/0284130 A1* | 11/2012 | Lewis | G06Q 40/00 |
| | | | 705/16 |
| 2013/0013490 A1 | 1/2013 | Keller | |
| 2013/0036048 A1* | 2/2013 | Campos | G06Q 20/40 |
| | | | 705/41 |
| 2013/0151360 A1 | 6/2013 | Scipioni et al. | |
| 2013/0198076 A1 | 8/2013 | Zambelli Hosmer | |
| 2013/0238455 A1 | 9/2013 | Laracey | |
| 2013/0246259 A1 | 9/2013 | Dessert | |
| 2013/0262316 A1* | 10/2013 | Hruska | G06Q 20/3572 |
| | | | 705/67 |
| 2013/0317928 A1* | 11/2013 | Laracey | G06Q 20/363 |
| | | | 705/41 |
| 2014/0006184 A1 | 1/2014 | Godsey | |
| 2014/0012701 A1 | 1/2014 | Wall | |
| 2014/0067566 A1 | 3/2014 | Leyva | |
| 2014/0101036 A1 | 4/2014 | Phillips | |
| 2014/0180777 A1 | 6/2014 | Moshrefi | |
| 2014/0188645 A1 | 7/2014 | Dimokas | |
| 2014/0195422 A1* | 7/2014 | Zheng | G06Q 20/105 |
| | | | 705/41 |
| 2014/0195425 A1* | 7/2014 | Campos | G06Q 20/3674 |
| | | | 705/41 |
| 2014/0222597 A1 | 8/2014 | Nadella | |
| 2014/0244514 A1* | 8/2014 | Rodriguez | G06Q 20/227 |
| | | | 348/150 |
| 2014/0249948 A1* | 9/2014 | Graylin | G06Q 20/326 |
| | | | 705/21 |
| 2014/0289061 A1 | 9/2014 | Zenou | |
| 2014/0291391 A1 | 10/2014 | Kumar | |
| 2014/0310174 A1 | 10/2014 | Heeter | |
| 2014/0330656 A1* | 11/2014 | Zhou | H04M 1/72439 |
| | | | 705/16 |
| 2014/0379532 A1 | 12/2014 | Agasti | |
| 2015/0006308 A1 | 1/2015 | Lin | |
| 2015/0006382 A1 | 1/2015 | Scipioni | |
| 2015/0026049 A1 | 1/2015 | Theurer | |
| 2015/0088674 A1 | 3/2015 | Flurscheim | |
| 2015/0170164 A1 | 6/2015 | Marsico | |
| 2015/0262174 A1 | 9/2015 | Mongillo, III | |
| 2016/0125417 A1 | 5/2016 | Huang et al. | |
| 2016/0162882 A1 | 6/2016 | Mcclung, III | |
| 2016/0203352 A1 | 7/2016 | Marsico | |
| 2016/0275492 A1 | 9/2016 | Brickell | |
| 2016/0292677 A1 | 10/2016 | Karlsson | |
| 2016/0342991 A1 | 11/2016 | Narasimhan | |
| 2017/0053301 A1 | 2/2017 | Khan | |
| 2017/0161728 A1 | 6/2017 | Satyanarayan | |
| 2017/0243206 A1 | 8/2017 | Kieffer et al. | |
| 2017/0372301 A1* | 12/2017 | Theurer | G06Q 20/36 |
| 2018/0165781 A1* | 6/2018 | Rodriguez | G06Q 40/00 |
| 2018/0293573 A1 | 10/2018 | Ortiz | |
| 2018/0300713 A1* | 10/2018 | Kieffer | G06Q 20/12 |
| 2018/0374083 A1 | 12/2018 | Krishnaiah | |
| 2019/0295054 A1 | 9/2019 | Purves | |
| 2020/0175496 A1* | 6/2020 | Finke | G06Q 20/3274 |
| 2021/0019741 A1* | 1/2021 | Kurani | G06Q 20/3674 |

OTHER PUBLICATIONS

New Walmart Pay app adds to mobile payments fray Dec. 9, 2015 https://www.cnet.com/tech/mobile/walmart-joins-mobile-payments-fray-with-walmart-pay-app/ (Year: 2015).*
"Walmart Introduces Walmart Pay: Pay with an iOS or Android smartphone, any major payment type and at any checkout lane—all through the Walmart app", Dec. 10, 2015, https://corporate.walmart.com/newsroom/2015/12/10/walmart-introduce-walmart-pay, 3 pages (Year: 2015).*
International Search Report and Written Opinion for Application No. PCT/US2018/058908, dated Jan. 16, 2019, 8 pages.
Constine, Josh "CurrentC is the Big Retailers' Clunky Attempt to Kill Apply Pay and Credit Card Fees," TechCrunch.com, October 25, 2014.
Gomzin, Slava "Mobile Checkout: Secure Mobile Payments," Gomzin.com, Apr. 2009.
Burelli, Francesco and Gina M. Lularevic "The New World of Retail: New Challenges and Opportunities for he retail industry in the digital age," MasterCard, May 6, 2015.
"Apple Pay: Your wallet. Without the wallet." Apple.com, accessed on Jul. 22, 2015.

* cited by examiner

DIGITAL WALLET MANAGEMENT SYSTEM

CROSS-REFERENCE TO RELATED APPLICATIONS

This application claims the benefit of commonly assigned U.S. Provisional Patent Application No. 62/609,595, which was filed on Dec. 22, 2017. The entire content of the foregoing provisional patent application is incorporated herein by reference.

BACKGROUND

Digital wallets generally require the customer to manually input the pertinent information of accounts into an application or other system, which can be a time-consuming process that is prone to errors.

SUMMARY

Exemplary embodiments of the present disclosure provide a system for digital wallet management that facilitates addition of payment methods to a digital wallet (e.g., an electronic and/or mobile wallet) based on prior use of the payment methods apart from the digital wallet. During checkout by the customer with a payment method, the system captures and securely collects the payment account information associated with the transaction. The physical or electronic receipt for the transaction can include a unique machine-readable element associated with the transaction. Such unique machine-readable element can be input into the system via, e.g., scanning or input of a serial number, to retrieve the transaction record, which can be linked to the payment account information. The system can retrieve the payment account information based on the transaction record to substantially automatically populate the payment account information into the digital wallet of the customer. Particularly, rather than manually inputting personal and account information about the payment method to be added to the digital wallet, the system is able to automatically populate such payment method information into the digital wallet with only minimal input from the user. The exemplary system therefore provides a convenient and effective manner in populating and managing a digital wallet, simplifying the user interface and minimizing the data entry required to add payment account information to the digital wallet. The exemplary system also provides added security to the addition of payment account information to a digital wallet because a user does not have to provide sensitive/confidential account information through an unsecure or susceptible device. That is, by maintaining the payment account information within a secure system and referencing the memory location at which the payment account information is encrypted and stored, the system does not expose the payment account information and does not present the payment account information to third party system which may or may not be secure.

In accordance with embodiments of the present disclosure, an exemplary system for digital wallet management including one or more databases and a computing system is provided. The one or more databases can be configured to electronically store data corresponding to a purchase history of a user. The purchase history includes payment account information for a first transaction captured through a reader at a point-of-sale system at the time of the first transaction and an identifier associated with the first transaction. The computing system can be in communication with the one or more databases.

The computing system can be configured to receive, as input at a user interface, a machine-readable element having the identifier associated with the first transaction encoded therein. Based on input of the machine-readable element, the computing system can be configured to search the one or more databases to identify a transaction record associated with the first transaction associated with the identifier and subsequently to determine the payment account information associated with the transaction. The computing system can be configured to generate, at the user interface, a prompt requesting confirmation of adding the payment account information from the first transaction to a digital wallet. The computing system can be configured to receive, as input at the user interface, positive confirmation to the generated prompt. The computing system can be configured to populate the digital wallet with the payment account information.

During the first transaction, a record storing the payment account information can be automatically created in the one or more databases. The payment account information can include credit card information, debit card information, discount card information, membership card information, other types of payment instrument information, combinations thereof, or the like. In some embodiments, the identifier can be a unique numeric or alphanumeric code assigned to the first transaction. In some embodiments, the machine-readable element can be a QR code or a barcode. The machine-readable element can be included on a printed or digital receipt associated with the first transaction.

Upon receiving positive confirmation to the generated prompt, the computing system can be configured to create the digital wallet, associate the digital wallet with the user, and electronically store data corresponding to the digital wallet in the one or more databases. During the first transaction, the computing system can be configured to encrypt the payment account information with a temporary reference number that points to a first memory location at which the payment account information is electronically stored. The temporary reference number can be erased after a specified time period. During populating the digital wallet with the payment account information, the computing system can be configured to retrieve the payment account information using the temporary reference number and to encrypt the payment account information with a permanent reference number. The permanent reference number can be electronically stored in the digital wallet in place of the payment account information.

During a second transaction, the computing system can be configured to receive payment from the digital wallet by pointing to a second memory location at which the permanent reference number is stored. During a second transaction, the computing system can be configured to receive as input information regarding one or more items to be purchased by the user, and the computing system can be configured to generate a digital shopping cart including the one or more items to be purchased. The computing system can be configured to generate payment for the one or more items in the digital shopping cart with the payment account information in the digital wallet to complete the second transaction. The computing system can be configured to pair with and transfer the digital shopping cart to a checkout terminal, such that payment for the one or more items in the digital shopping cart can be completed at the checkout terminal with the digital wallet.

In accordance with embodiments of the present disclosure, exemplary non-transitory computer-readable medium storing instructions for digital wallet management is provided. The instructions are executable by a processing device of a computing system. Execution of the instructions by the processing device can cause the processing device to electronically store in one or more databases data corresponding to a purchase history of a user. The purchase history can include or be linked to payment account information for a first transaction captured through a reader at a point-of-sale system at the time of the first transaction and an identifier associated with the first transaction. Execution of the instructions by the processing device can cause the processing device to receive, as input at a user interface, a machine-readable element having the identifier associated with the first transaction encoded therein.

Based on input of the machine-readable element, execution of the instructions by the processing device can cause the processing device to search the one or more databases to determine the payment account information associated with the identifier. Execution of the instructions by the processing device can cause the processing device to generate, at the user interface, a prompt requesting confirmation of adding the payment account information from the first transaction to a digital wallet. Execution of the instructions by the processing device can cause the processing device to receive, as input at the user interface, positive confirmation to the generated prompt. Execution of the instructions by the processing device can cause the processing device to populate the digital wallet with the payment account information.

In some embodiments, the machine-readable element can be a QR code or a barcode. Upon receiving positive confirmation to the generated prompt, execution of the instructions by the processing device can cause the processing device to create the digital wallet, associate the digital wallet with the user, and electronically store data corresponding to the digital wallet in the one or more databases. During the first transaction, execution of the instructions by the processing device can cause the processing device to encrypt the payment account information with a temporary reference number that points to a first memory location at which the payment account information is stored. The temporary reference number can be erased after a specified time period.

During populating the digital wallet with the payment account information, execution of the instructions by the processing device can cause the processing device to retrieve the payment account information using the temporary reference number and to encrypt the payment account information with a permanent reference number. The permanent reference number can be stored in the digital wallet in place of the payment account information. During a second transaction, execution of the instructions by the processing device can cause the processing device to receive payment from the digital wallet by pointing to a second memory location at which the permanent reference number is stored.

In accordance with embodiments of the present disclosure, an exemplary method of digital wallet management is provided. The method includes electronically storing in one or more databases data corresponding to a purchase history of a user. The purchase history can include payment account information for a first transaction captured through a reader at a point-of-sale system at the time of the first transaction and an identifier associated with the first transaction. The method includes receiving, as input at a user interface, a machine-readable element having the identifier associated with the first transaction encoded therein.

Based on input of the machine-readable element, the method includes searching the one or more databases to determine the payment account information associated with the identifier. The method includes generating, at the user interface, a prompt requesting confirmation of adding the payment account information for the first transaction to a digital wallet. The method includes receiving, as input at the user interface, positive confirmation to the generated prompt. The method includes populating the digital wallet with the payment account information.

In accordance with embodiments of the present disclosure, an exemplary method for paying at a point of sale is provided. The method includes starting a transaction at the point of sale, receiving a pairing request at a wallet processor from a customer mobile device operating a mobile application in response to scanning of a code having a transaction identification, associating a customer payment profile with the transaction identification and sending associated information to the point of sale, sending an amount of sale to authorize to the wallet processor in response to completing scanning of items at the point of sale, creating an authorization(s) for payment and sending the authorization for payment to an authorizer, and completing the transaction by processing payment.

In accordance with embodiments of the present disclosure, an exemplary method for paying at a point of sale is provided. The method includes starting a transaction at the point of sale, receiving a pairing request at a wallet processor from a customer mobile device operating a mobile application in response to transmitting a transaction identification from a wireless device of the point of sale to the customer mobile device, associating a customer payment profile with the transaction identification and sending associated information to the point of sale, sending an amount of sale to authorize to the wallet processor in response to completing scanning of items at the point of sale, creating an authorization for payment and sending the authorization for payment to an authorizer, and completing the transaction by processing payment.

In accordance with embodiments of the present disclosure, an exemplary system for re-using e-commerce payment instruments for in-store purchasing is provided. The system includes a backend system including a wallet processor and a memory. The memory stores a customer payment profile including an already established e-commerce payment profile. The system includes a mobile device in communication with the wallet processor, and a point of sale in communication with the wallet processor and the mobile device. The mobile device operates a mobile application to communicate with the wallet processor to associate a transaction identification from the point of sale with the customer payment profile. The system includes an authorizer for authorizing a payment of an amount of sale in response to receiving the amount of sale from the wallet processor.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the digital wallet management system, reference is made to the accompanying figures, wherein.

DETAILED DESCRIPTION

Figure 1:
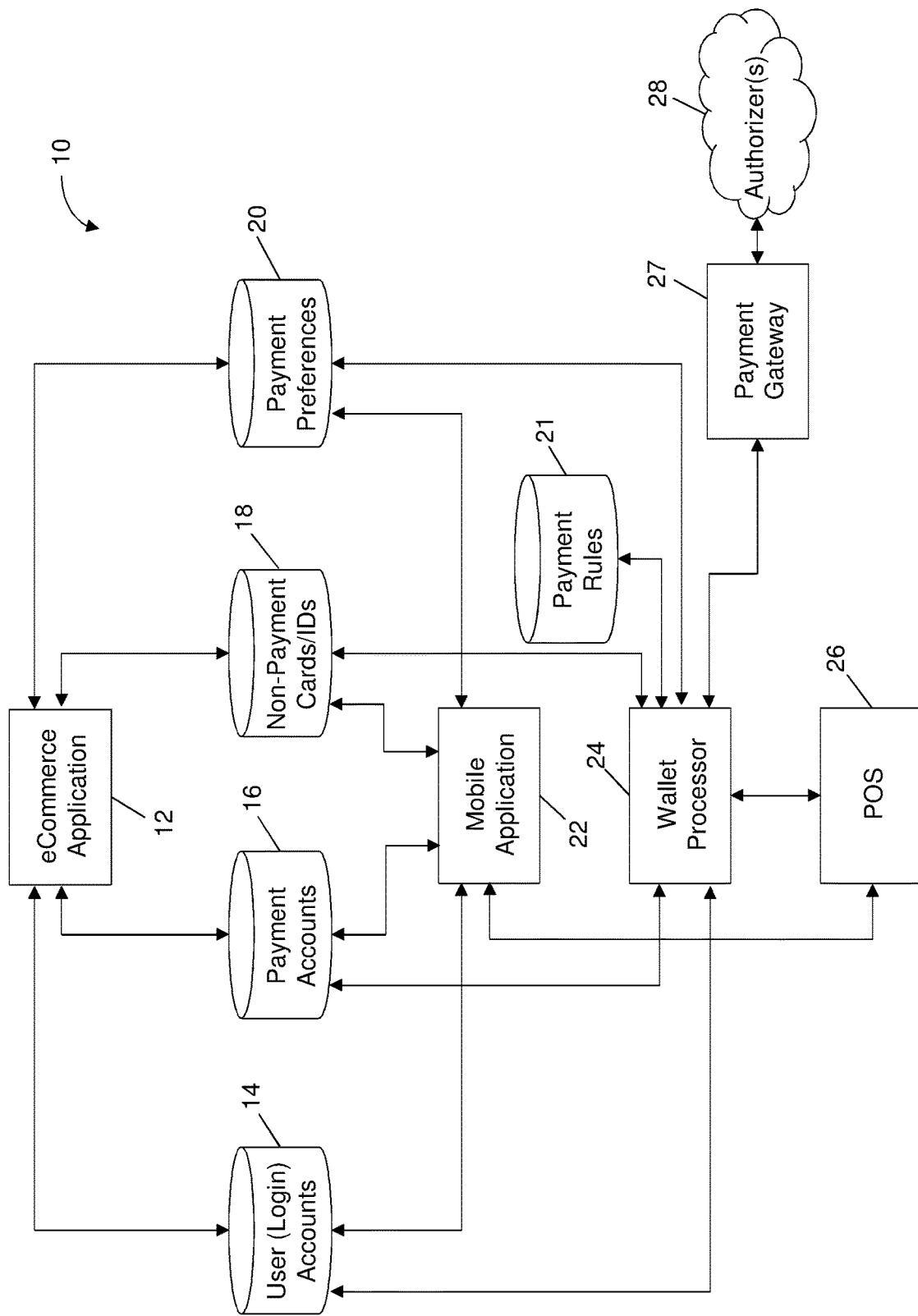
FIG. 1 is a block diagram of an exemplary system for re-using e-commerce payment instruments for in-store purchasing.

Many store customers have times when they shop online and other times when they are physically present at a brick-and-mortar store. In order to shop online, a customer may establish an e-commerce account (e.g., a digital wallet) with the particular business which often includes entering and storing payment instruments in a database for use with the that particular business or may reenter account information for each transaction. Creating an e-commerce account provides ease of checking out at the end of an online shopping session, wherein the customer can simply execute a few mouse clicks or other input, such as use of a touchscreen and the like, to execute payment to complete an online transaction without having to enter payment account information.

Shopping in a brick-and-mortar store requires the customer must move around and peruse items and goods with the store, select the goods, often putting them within a cart and then proceeding to a checkout line, where a point of sale terminal is then used to scan or otherwise total the amount of money due to purchase the items. The customer must then retrieve the payment instrument from his or her wallet or purse and provide the payment instrument to the point of sale terminal. If a payment card is used as the type of payment instrument, the card is either swiped by the customer or the employee at the checkout and the payment is processed either by entering a personal identification number ("PIN") or signing to authorize the payment, thus completing the transaction.

Online customers enjoy an expedient check out that is typically not offered at a brick-and-mortar store. The present inventive concepts provide the benefits of online checkout processes with in-store shopping without the need for re-entering payment account information to perform a transaction. For example, the customer can use a payment instrument already saved in the customer's e-commerce account with a business to pay for a transaction that occurs in a brick-and-mortar store of the same business.

Exemplary embodiments of the present disclosure provide a digital wallet management system that allows for a convenient and efficient way to add payment instruments to a digital wallet without requiring the customer to manually input all data associated with the payment instrument. The exemplary system includes one or more databases for electronically storing data corresponding to the purchase history of the customer or user, with such information including payment account information (e.g., information associated with the payment instrument used during a transaction). The payment account information is automatically captured at the point-of-sale (POS) when the user swipes the payment instrument during the transaction. An identifier is associated with the payment account information and stored in the database. A computing system receives as input a machine-readable element (e.g., a QR code, a barcode, or the like), and prompts the user to add the payment account information to the digital wallet. Thus, scanning the machine-readable element allows the user to automatically populate the digital wallet with the payment account information without manually inputting all data corresponding with the payment account information. In some embodiments, only a minimal input (e.g., a security code) may be requested from the user prior to populating the digital wallet with the payment account information.

FIG. 1 is a block diagram of a system 10 for re-using payment instruments for in-store purchasing. The system 10 may include a backend system having various databases, such as, but not limited to user accounts 14, payment accounts 16, non-payment cards/identifiers 18, payment preferences 20, and payment rules 21 (e.g., collectively forming a digital wallet). These databases 14, 16, 18 and 20 are accessible from an e-commerce application 12. Further, the databases 14, 16, 18 and 20 are accessible from a mobile application 22. The system 10 may also include a wallet processor 24, a point of sale ("POS") 26, a payment gateway 27 and an authorizer(s) 28. The wallet processor 24 may have access to payments accounts 16, non-payment cards/identifiers 18, payment preferences 20, and payment rules 21 databases. The e-commerce application 12 may be accessible through a computing device, such as but not limited to a computer, a laptop, a tablet, a smartphone and the like. The e-commerce application 12 may be an e-commerce website accessible through an Internet connection. The mobile application 22 may be accessible through a mobile device, such as a smartphone, a tablet and the like. The mobile application 22 may be a downloadable application that is installed and operated on the mobile device. The payment gateway 27 may operate to send messages routed to the authorizers 28.

Figure 2:
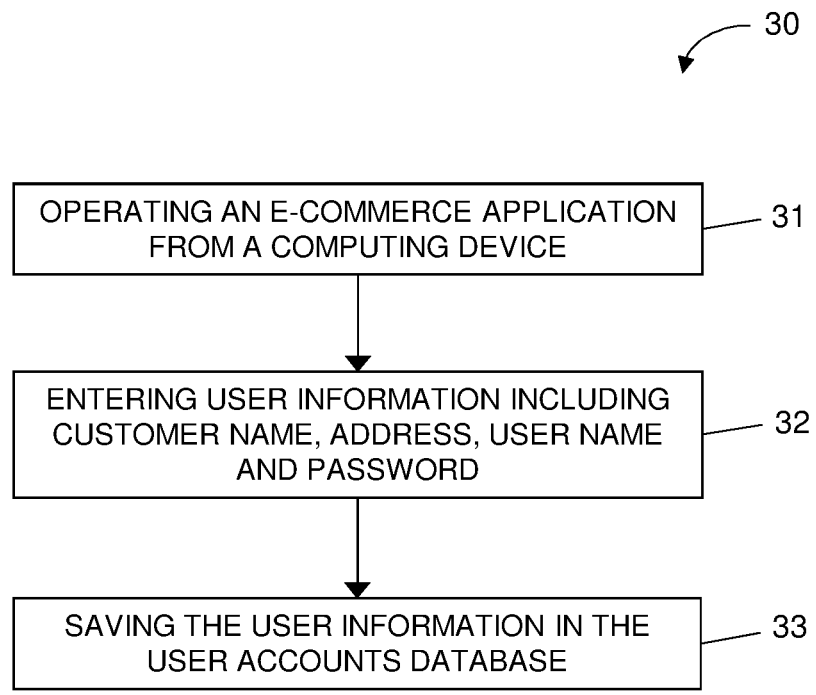
FIG. 2 is a flow diagram illustrating an exemplary method for creating an e-commerce account.

Referring additionally to FIG. 2, the system 10 may be utilized to execute a method 30 of creating an e-commerce account. The method 30 may include operating an e-commerce application 12 from a computing device (Step 31); entering user information including customer name, address, user name and password (Step 32); and saving the user information in the user accounts 14 database (Step 33). The method 30 may further include entering a payment instrument information through the e-commerce application 45 and storing the payment instrument information in the payment accounts 16 database. The method 30 may also include entering non-payment card/identifier information through the e-commerce application 12 and storing the non-payment card/identifier information in the non-payment cards/identifier 18 database. It will be understood that the method 30, in some embodiments, is a precondition to using the system to complete a transaction at a POS 26. As will be discussed in greater detail below, the payment account information (whether payment instrument, non-payment card/identifier, or the like) can either be entered manually or through the exemplary digital wallet management system. For example, such payment account information can be securely captured by the system during a first transaction, and upon input of a machine-readable element by the user at a time after the first transaction, the payment account information can be populated into the digital wallet for future use.

Further, access to the user accounts 14, payment accounts 16, non-payment cards/identifiers 18 and payment preferences 20 databases are secured by restricting access to the information. The username and password stored in the user accounts 14 database includes the information that must be input through a user graphical interface in order for a customer to login to his or her e-commerce account to access, update, change and the like the information stored in the user accounts 14, payment accounts 16, non-payment cards/identifiers 18, and payment preferences 20 databases. The customer may login to the e-commerce account through the e-commerce application 12 or through the mobile application 22.

It is anticipated that the user account 14 may be changed and updated at any time through use of the e-commerce application 12 or the mobile application 22. For example, address information may be updated, additional payment instruments may be added to the payment accounts 16 (manually or substantially automatically through the digital wallet management system), and additional non-payment cards may be added to the non-payment cards/identifier 18. Further, as payment instruments expire, the payment instrument information stored in the payment accounts 16 may be updated or removed.

Figure 3:
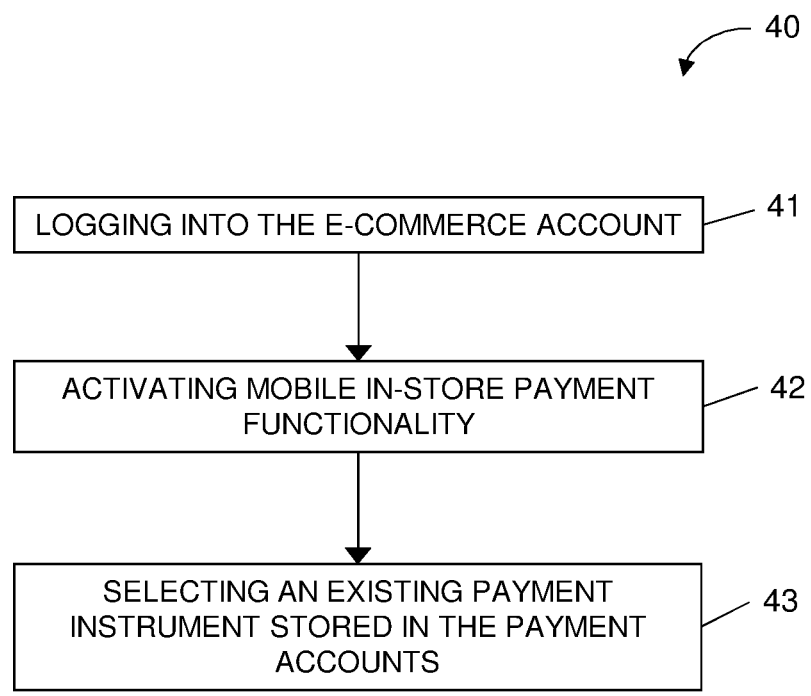
FIG. 3 is a flow diagram illustrating an exemplary method for setting up e-commerce payments instruments for use in-store.

FIG. 3 depicts a method 40 of setting up e-commerce payments instruments for in-store use. For example, the method 40 may include logging into the e-commerce account (Step 41) through the mobile application 22 or through the e-commerce application 12; activating mobile in-store payment functionality (Step 42), activating the mobile in-store payment functionality requires creating a new payment authentication code, such as a PIN, password and the like; and selecting an existing payment instrument stored in the payment accounts 16 for use in mobile in-store payment (Step 43). This information may be stored in the payment preferences 20.

Step 43 of selecting an existing payment instrument may be repeated to select multiple payment instruments for use with mobile in-store payments. If multiple payment instruments are selected, the customer may also indicate how he or she prefers to use the payment instruments when conducting transactions in the store.

The method 40 may also include entering a new payment instrument through the mobile application 22 and indicating if it may also be used for e-commerce transactions and/or how the customer prefers to use the payment instrument when transacting in the store. Such method can include manually inputting the payment instrument information, or entering the new payment instrument information using the digital wallet management system.

The method 40 may also include presenting a list of existing non-Payment cards/identifiers (e.g. Membership, Loyalty, Discount, Offers) to a customer and selecting which non-payment cards/identifiers to load for mobile in-store processing. This may be repeated if there are multiple non-payment cards on file. The method may also include entering new non-Payment cards/identifiers to the non-payment cards/identifiers 18 database and selecting it to be used for e-commerce transactions or when transacting in the store.

Figure 4:
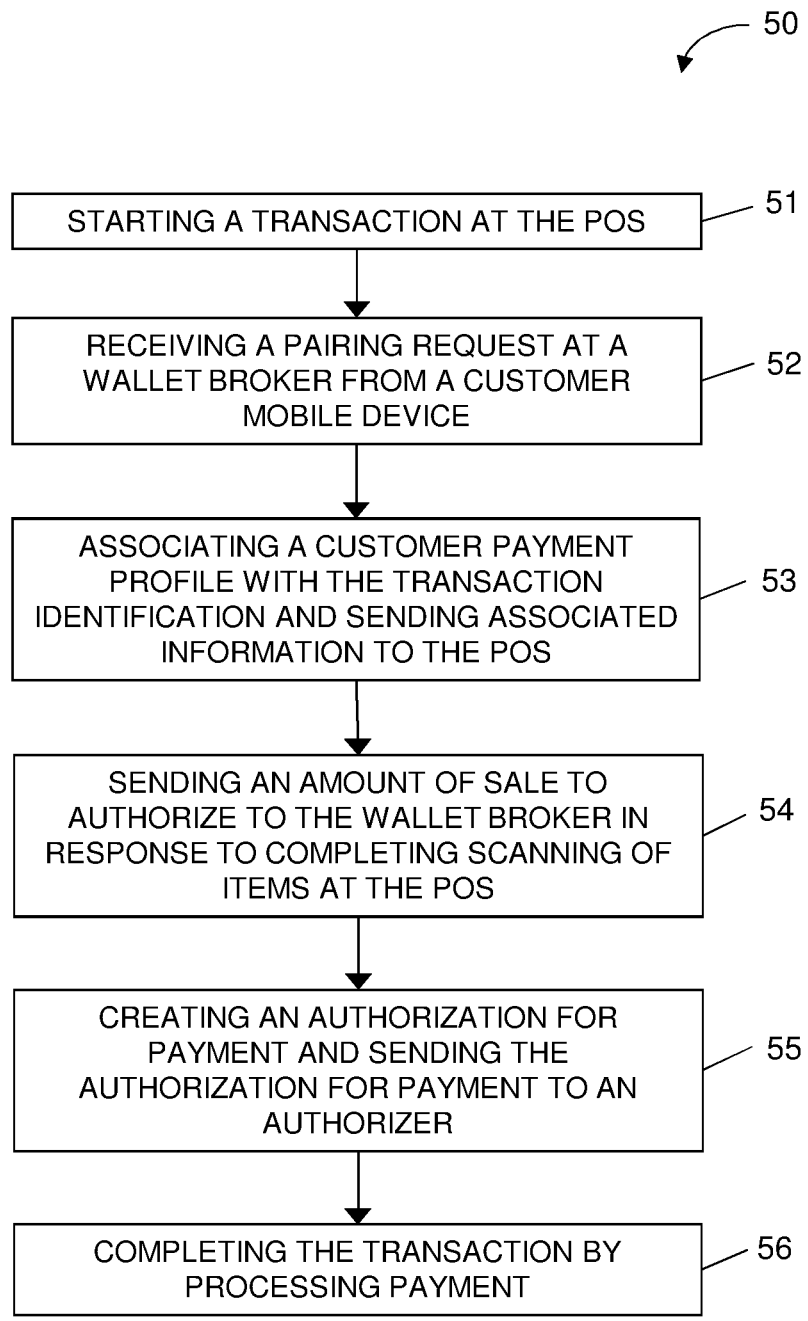
FIG. 4 is a flow diagram illustrating an exemplary method for executing a transaction at a store checkout using a system for re-using e-commerce payment instruments for in-store purchasing.

FIG. 4 depicts a method 50 for executing a transaction at a store checkout using a system for re-using e-commerce payment instruments for in-store purchasing. The method 50 may include starting a transaction at the POS 26 (Step 51); receiving a pairing request at a wallet processor 24 from a customer mobile device operating a mobile application 22 in response to scanning of a code having a transaction identification (Step 52); associating a customer payment profile with the transaction identification and sending associated information to the POS (Step 53); sending an amount of sale to authorize to the wallet processor in response to completing scanning of items at the POS (Step 54); creating an authorization for payment and sending the authorization for payment to an authorizer 28 (Step 55); and completing the transaction by processing payment (Step 56).

In a method 50, the customer payment profile may include an already established e-commerce payment profile stored in a payment preferences 20 database. Further, the customer payment profile may further include one or more payment instruments stored in the payment accounts 16 database.

The scanning of the code of Step 52 may include scanning the code generated by the POS 26. In another embodiment, scanning the code may include scanning the code generated by the customer mobile device with a scanning device at the POS 26.

The method 50 may further include designating one payment instrument of the one or more payment instruments in the customer payment profile as a default payment instrument prior to starting the transaction. The method 50 may include alerting the wallet processor that the transaction is complete; and alerting the mobile device from the wallet processor that the transaction is complete.

Figure 5:
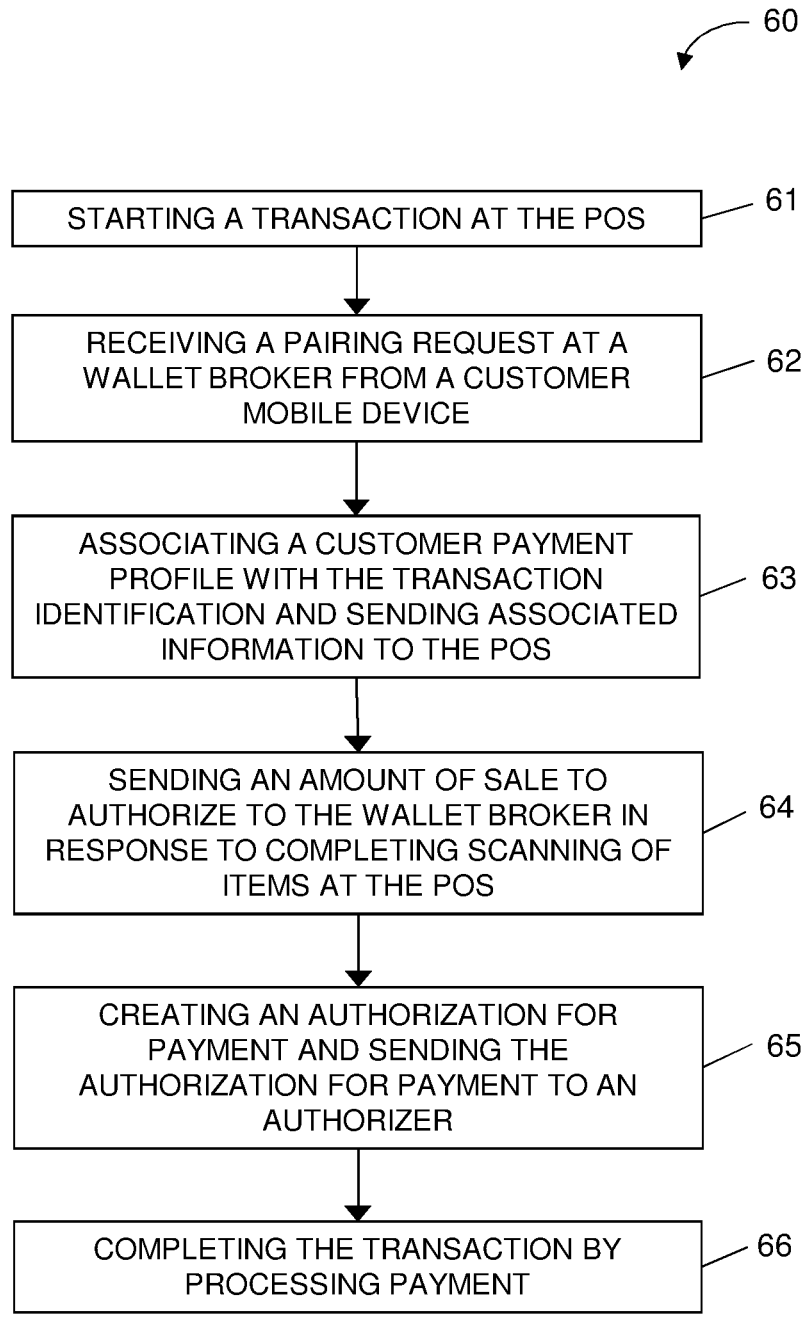
FIG. 5 is a flow diagram illustrating an exemplary method for executing a transaction at a store checkout using a system for re-using e-commerce payment instruments for in-store purchasing.

FIG. 5 depicts a method 60 for executing a transaction at a store checkout using a system for re-using e-commerce payment instruments for in-store purchasing in accordance with embodiments. Method 60 may include starting a transaction at the POS 26 (Step 61); receiving a pairing request at a wallet processor from a customer mobile device operating a mobile application in response to transmitting a transaction identification from a wireless device of the POS 26 to the customer mobile device (Step 62); associating a customer payment profile with the transaction identification and sending associated information to the POS 26 (Step 63); sending an amount of sale to authorize to the wallet processor in response to completing scanning of items at the POS 26 (Step 64); creating an authorization for payment and sending the authorization for payment to an authorizer 28 (Step 65); and completing the transaction by processing payment (Step 66).

In method 60 the customer payment profile includes an already established e-commerce payment profile stored in a payment preferences 20 database. The customer payment profile may also include one or more payment instruments stored in a payment accounts 16 database.

The method 60 may include designating one payment instrument of the one or more payment instruments in the customer payment profile as a default payment instrument prior to starting the transaction. The method 60 may include alerting the wallet processor that the transaction is complete and alerting the mobile device from the wallet processor that the transaction is complete.

Transmitting the transaction identification from the wireless device to the customer mobile device of Step 63 includes transmitting with a Bluetooth low energy communication. Further, transmitting the transaction identification from the wireless device to the customer mobile device may include transmitting with a near field communication. Further still, transmitting the transaction identification from the wireless device to the customer mobile device includes transmitting data with a radio frequency communication.

Step 65 of sending an authorization for payment to the authorizer 28 may also include sending an authorization for payment to a payment gateway 27. The payment gateway 27 may then send the authorization for payment to the authorizer(s) 28. The payment gateway 27 may operate to control the sending of the authorizations to the authorizer(s) 28.

Referring additionally to FIG. 1, in performing the method 50, the POS 26 creates a unique transaction/basket ID. The POS 26 may display a code, such as a one-dimensional barcode or QR code that includes the unique transaction/basket ID for the customer to capture with his or her mobile device operating the mobile application 22. In some other embodiments, the unique transaction/basket ID may be transmitted wirelessly (e.g. BLE), to the customer's mobile device.

In order for the customer's mobile device to scan the code from the display, a customer may log in using the mobile application operating on the mobile device and navigates to a payment feature. The customer may then provide the Payment Authentication Code (e.g. PIN, password, etc.) in order to validate the payment feature. The customer may then capture transaction/basket ID from the code created by the POS 26.

In order for the customer's mobile device to obtain the unique transaction/basket ID wirelessly, a wireless message is sent from the POS 26 to the mobile device of the customer. When the message is received, the customer is asked through the mobile device operating the mobile application 22 if he or she wishes to use the payment feature. If the customer wishes to use the payment feature, the customer may select so using the mobile application and the mobile application 22 automatically navigates to the payment feature and the customer may provide the Payment Authentication Code (e.g. PIN, password, etc.) in order to validate the payment feature.

The mobile application 22 alerts the wallet processor 24 of a pairing request, wherein the wallet processor 24 gathers customer/payment/card data and sends the customer/payment/card data to the POS 26. The POS 26 completes scanning items and sends amount to authorize to wallet processor after verbal confirmation of the amount to be paid by the customer.

The wallet processor 24 uses the payment preferences, payment rules 21 and payment instruments to create one or more authorizations and sends them to the authorizer 28. The wallet processor 24 then sends the responses to the POS 26. The POS 26 completes the transactions and alerts the wallet processor 24 that the transaction is complete. The wallet processor 24 may then alert the mobile device that the transaction is complete in order to alert the customer.

In another embodiment, a customer may log in using a mobile application 22 and navigate to a payment feature. The customer may then provide Payment Authentication Code (e.g. PIN, password, etc.) in order to validate the payment feature. The mobile application 22 may then retrieve a transaction/basket ID from the wallet processor 24. The mobile application 22 encodes the transaction/basket ID and displays either one-dimensional barcode or QR code having the transaction/basket ID. The POS 26 may then scan the transaction/basket ID.

The POS 26 alerts the wallet processor 24 of a pairing request, and the wallet processor gathers customer/payment/card data and sends the customer/payment/card data to the POS 26. The POS 26 may complete scanning items and send an amount owed to be authorized to the wallet processor 24. The wallet processor 24 uses the payment instruments stored in the payment accounts 16, payment preferences 20 and payment rules 21 databases to create one or more authorizations and send them to the authorizer 28. The wallet processor 24 sends responses to the POS 26. The POS 26 completes the transaction and alerts the wallet processor 24 that the transaction is complete. The wallet processor 24 may then alert the mobile device that the transaction is complete in order to alert customer.

Figure 6:
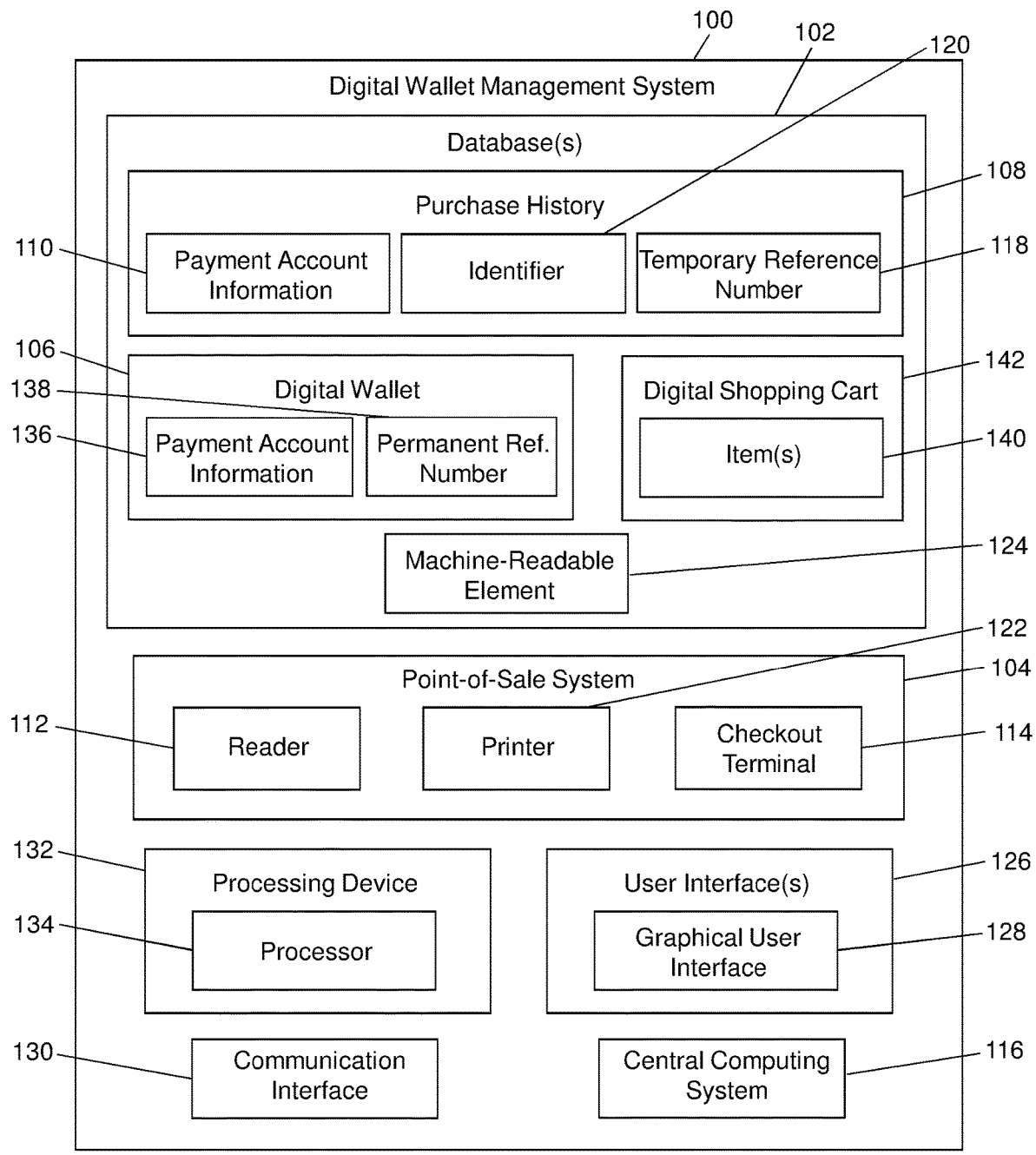
FIG. 6 is a block diagram of an exemplary digital wallet management system of the present disclosure.

FIG. 6 is a block diagram of an exemplary digital wallet management system 100 (hereinafter "system 100") of the present disclosure. In some embodiments, the system 100 can be a separate component from the system 10 and can be communicatively coupled with the system 10 such that payment account information in the system 10 can be updated or changed. In some embodiments, the system 100 can be part of the system 10. In some embodiments, the system 10 can be part of the system 100.

The system 100 includes one or more databases 102 configured to electronically receive and store data associated with transactions performed at one or more point-of-sale (POS) systems 104, and data associated with one or more digital wallets 106. The databases 102 can also be configured to electronically receive and store data associated with the system 10. The database 102 is configured to electronically store data corresponding to a purchase history 108 of a customer or user (e.g., purchases made by the user at one or more locations). The purchase history 108 can include payment account information 110, which can be any form of electronic payment method, such as gift card, credit card, debit card, combinations thereof, or the like.

The payment account information 110 can be captured at a checkout terminal 114 of the POS 104 through a reader 112. For example, during a first transaction by the user at the checkout terminal 114, the user can swipe or enter the payment method at the reader 112 to complete the transaction for one or more items (e.g., swiping a credit card at the reader 112). The system 100 can capture the data associated with the method of payment used as the payment account information 110 including, e.g., full name of user, number associated with method of payment (credit/debit card number), expiration date, card verification value (CCV) code, security pin, combinations thereof, or the like. The payment account information 110 is therefore captured, transmitted and stored in the database 102 in real-time during and/or immediately after the first transaction. A record storing the payment account information 110 can therefore be created automatically in the database 102 during the first transaction.

The system 100 can include a central computing system 116 communicatively coupled to the POS system 104 and the database 102. In some embodiments, during the first transaction, the POS system 104 and/or the central computing system 116 can encrypt captured the payment account information 110 and associate the encrypted captured payment account information with a temporary reference number 118. The temporary reference number 118 can be electronically stored in the database 102 and points to a first memory location at which the encrypted payment account information 110 is stored. The temporary reference number 118 can be automatically erased by the system 100 after a specified or predetermined period of time (e.g., after one week, after one month, after one year, or the like). During capture of the payment account information 110, the system 100 can associate a unique identifier 120 (e.g., a number or alphanumeric code) with the first transaction. Thus, the payment account information 110, the identifier 120, and the temporary reference number 118 are correlated in the database 102.

Upon completing the first transaction, the POS system 104 can print or issue a receipt (e.g., via a printer 122) or a digital receipt (e.g., view e-mail, sms message, via an web account). In some embodiments, the POS system 104 can output a physical, printed receipt for the user after the first transaction. In some embodiments, the POS system 104 can output an electronic/digital receipt (e.g., e-mailed to the user's e-mail address). The receipt can include a list of items acquired during the first transaction, and further includes a unique machine-readable element 124 (e.g., a QR code, a barcode, or the like) encoded with the identifier 120. The machine-readable element 124 can be scanned or read by a scanner of the user's mobile device to input the identifier 120, or the identifier 120 can be manually entered into a user interface, such as a user interface on a website.

After the first transaction, the central computing system 116 can receive as input the identifier 120, e.g., extracted from the machine-readable element 124. For example, the system 100 can include a user interface 126 having a graphical user interface (GUI) 128. In some embodiments, the user interface 126 can be, e.g., an interface at the user's mobile device, an interface at a computing system, an interface at a kiosk, combinations thereof, or the like. A communication interface 130 of the system 100 can provide a network through which electronic data can be transmitted/received between the user interface 126, the central computing system 116, the POS system 104, and the database 102. The system 100 can include a processing device 132 with a processor 134 for processing the data received at the central computing system 116.

The identifier 120 can be input into the central computing system 116 via the user interface 126. For example, the user can implement a scanner at a mobile device to scan the machine-readable element 124 and extract the identifier 120. Rather than randomly generating notifications requesting the user to add the payment account information 110 to the digital wallet 106, the system 100 allows the user to choose a point in time after the first transaction when they are ready to create or update the digital wallet 106 to include the payment account information 110 from the first transaction. Particularly, by providing the machine-readable element 124 on the receipt, the user is allowed to scan the machine-readable element 124 at some time after the first transaction. Providing the machine-readable element 124 increases the chances of a positive response from the user for creating or updating the digital wallet 106. In some embodiments, the system 100 can issue a notification to the user via the GUI 128 regarding adding the payment account information 110 to the digital wallet 106. For example, if the temporary reference number 118 is close to (e.g., an hour, a day, a week, a month away from) an expiration date (e.g., the payment account information 110 is to be cleared), the system 100 can issue a reminder notification to the user.

Based on the received input of the machine-readable element 124, the central computing system 116 can search the database 102 to determine the payment account information 110 associated with the identifier 120 encoded in the machine-readable element 124. For security purposes, the central computing system 116 can authenticate the user based on, e.g., a comparison between the identity of the device used to input the machine-readable element and the information collected and stored as the payment account information 110. In exemplary embodiments, the identifier 120 can be used to retrieve transaction information associated with the first transaction including the temporary reference number 118 and subsequently can use the temporary reference number 118 to link to the encrypted payment account information 110. Upon locating the corresponding payment account information 110, the system 100 can generate a prompt at the user interface 126 requesting confirmation from the user regarding adding the payment account information 110 for the first transaction to the digital wallet 106 of the user. Particularly, the prompt requests confirmation that the user wishes to add the payment method used in the first transaction to their digital wallet 106.

The user inputs confirmation to the prompt through the user interface 126, indicating to the system 100 that the payment account information 110 should be added to the digital wallet 106. Upon receiving confirmation from the user, the system 100 populates the digital wallet 106 with the payment account information 136 (corresponding with the payment account information 110). The payment account information 136 is thereby added substantially automatically to the digital wallet 106 without manual input of all data associated with the payment account information 136. In some embodiments, if the user does not have an existing digital wallet 106, the system 100 can create the digital wallet 106, associate the digital wallet 106 with the user, and electronically stores data corresponding to the digital wallet 106 in the database 102. In some embodiments, the user can be prompted to enter a username, password and/or passcode for the digital wallet 106.

In some embodiments, during the step of populating the digital wallet 106 with the payment account information 136, the central computing system 116 can retrieve the payment account information 110 using the temporary reference number 118 and associated the payment account information 136 with a permanent reference number 138. In some embodiments, the permanent reference number 138 can be electronically stored in the digital wallet 106 in place of the payment account information 136, such that the payment account information 110 can be retrieved using the permanent reference number 138. In some embodiments, the payment account information 136 can be transferred into the digital wallet 106 and the payment account information 110 can be deleted from the purchase history 108.

In some embodiments, rather than retrieving the encrypted payment account information, the system 100 deletes the temporary reference number 118 and replaces it with the permanent reference number 138, which is different than the temporary reference number 118, such that the permanent reference number 138 is linked to the encrypted payment account information 110, 136 and the temporary reference number 118 is no longer linked to the encrypted payment account information 110, 136 and is no longer operational. Thus, if a third party found the receipt and attempted to add the payment account information 110, 136 to their digital wallet, the system 100 would not be able to retrieve the payment account information 110, 136 using the temporary reference number 118 associated with the transaction record. Additionally, by deleting the temporary reference number 118 and linking the permanent reference number 138 to the memory location at which the encrypted payment account information 110, 136 is stored, the system 100 does not expose an unencrypted version of the payment account information 110, 136 when adding the payment account to the digital wallet 106.

During a second transaction, the central computing system 116 can receive payment from the digital wallet 106 by pointing to a second memory location at which the permanent reference number 138 is stored. The permanent reference number 138 can be used to retrieve and identify the corresponding encrypted payment account information 110 to use for second transaction. In some embodiments, the second transaction can occur during acquisition at the checkout terminal 114. In some embodiments, the central computing system 116 can receive as input information regarding one or more items 140 to be purchased by the user. For example, the user can scan the barcode of each item as they shop within the store. Based on the input information, the central computing system 116 can generate a digital shopping cart 142 including the items 140 to be purchased.

In some embodiments, the central computing system 116 can generate payment for the items 140 in the digital shopping cart 142 with the payment account information 110, 136 directly through interaction with the digital wallet 106 to complete the second transaction. Thus, the user can complete the second transaction without visiting the POS system 104. In some embodiments, the central computing system 116 can be configured to pair with and transfer the digital shopping cart 142 to the checkout terminal 114. Payment for the items 140 for which information was transferred from the digital shopping cart 142 can thereby be completed at the checkout terminal 114 using the digital wallet 106.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), solid-state drives (SSD), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a wireless network, a cellular data network, a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
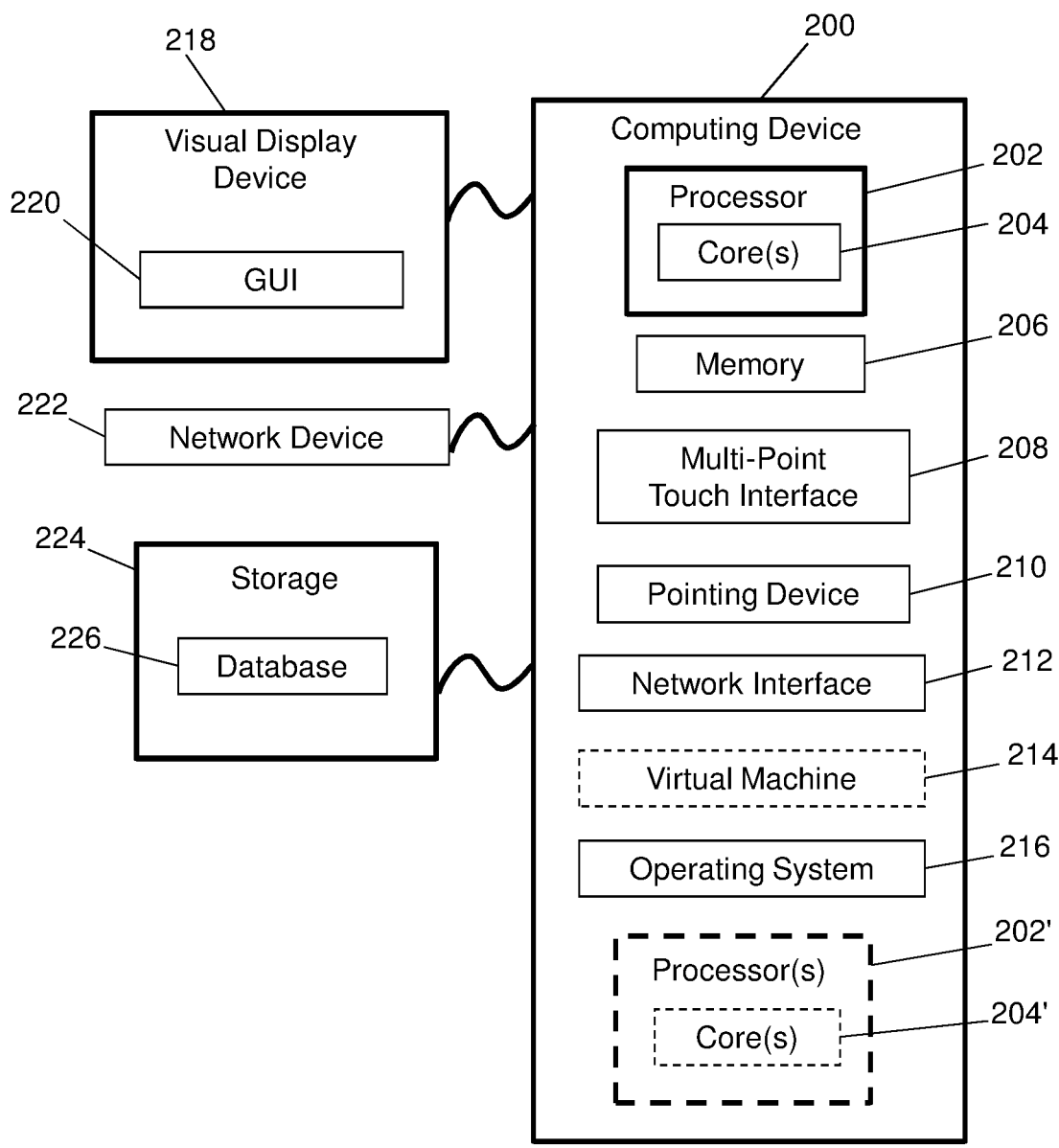
FIG. 7 is a block diagram of a computing device in accordance with exemplary embodiments of the present disclosure.

For example, FIG. 7 is a block diagram of a computing device 200 in accordance with exemplary embodiments of the present disclosure. The computing device 200 includes one or more non-transitory computer-readable media for storing one or more computer-executable instructions or software for implementing exemplary embodiments (e.g., systems 10, 100). The non-transitory computer-readable media may include, but are not limited to, one or more types of hardware memory, non-transitory tangible media (for example, one or more magnetic storage disks, one or more optical disks, one or more flash drives), and the like. For example, memory 206 included in the computing device 200 may store computer-readable and computer-executable instructions or software for implementing exemplary embodiments of the present disclosure (e.g., instructions for operating the database 102, instructions for operating the POS system 104, instructions for operating the processing device 132, instructions for operating the user interface 126, instructions for operating the central computing system 116, instructions for operating the communication interface 130, combinations thereof, or the like). The computing device 200 also includes configurable and/or programmable processor 202 and associated core 204, and optionally, one or more additional configurable and/or programmable processor(s) 202' and associated core(s) 204' (for example, in the case of computer systems having multiple processors/cores), for executing computer-readable and computer-executable instructions or software stored in the memory 206 and other programs for controlling system hardware. Processor 202 and processor(s) 202' may each be a single core processor or multiple core (204 and 204') processor.

Virtualization may be employed in the computing device 200 so that infrastructure and resources in the computing device 200 may be shared dynamically. A virtual machine 214 may be provided to handle a process running on multiple processors so that the process appears to be using only one computing resource rather than multiple computing resources. Multiple virtual machines may also be used with one processor. Memory 206 may include a computer system memory or random access memory, such as DRAM, SRAM, EDO RAM, and the like. Memory 206 may include other types of memory as well, or combinations thereof.

A user may interact with the computing device 200 through a visual display device 218 (e.g., a personal computer, a mobile smart device, or the like), such as a computer monitor, which may display one or more user interfaces 220 (e.g., GUI 128) that may be provided in accordance with exemplary embodiments. The computing device 200 may include other I/O devices for receiving input from a user, for example, a keyboard or any suitable multi-point touch interface 208, a pointing device 210 (e.g., a mouse), or the like. The keyboard 208 and the pointing device 210 may be coupled to the visual display device 218. The computing device 200 may include other suitable conventional I/O peripherals.

The computing device 200 may also include one or more storage devices 224, such as a hard-drive, CD-ROM, or other computer readable media, for storing data and computer-readable instructions and/or software that implement exemplary embodiments of the system 100 described herein. Exemplary storage device 224 may also store one or more databases 226 for storing any suitable information required to implement exemplary embodiments. For example, exemplary storage device 224 can store one or more databases 226 for storing information, such as data relating to the purchase history 108, the digital wallet 106, the digital shopping cart 142, the machine-readable element 124, combinations thereof, or the like, and computer-readable instructions and/or software that implement exemplary embodiments described herein. The databases 226 may be updated by manually or automatically at any suitable time to add, delete, and/or update one or more items in the databases.

The computing device 200 can include a network interface 212 configured to interface via one or more network devices 222 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 212 may include a built-in network adapter, network interface card, PCMCIA network card, card bus network adapter, wireless network adapter, USB network adapter, modem or any other device suitable for interfacing the computing device 200 to any type of network capable of communication and performing the operations described herein. Moreover, the computing device 200 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 200 may run any operating system 216, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 216 may be run in native mode or emulated mode. In an exemplary embodiment, the operating system 216 may be run on one or more cloud machine instances.

Figure 8:
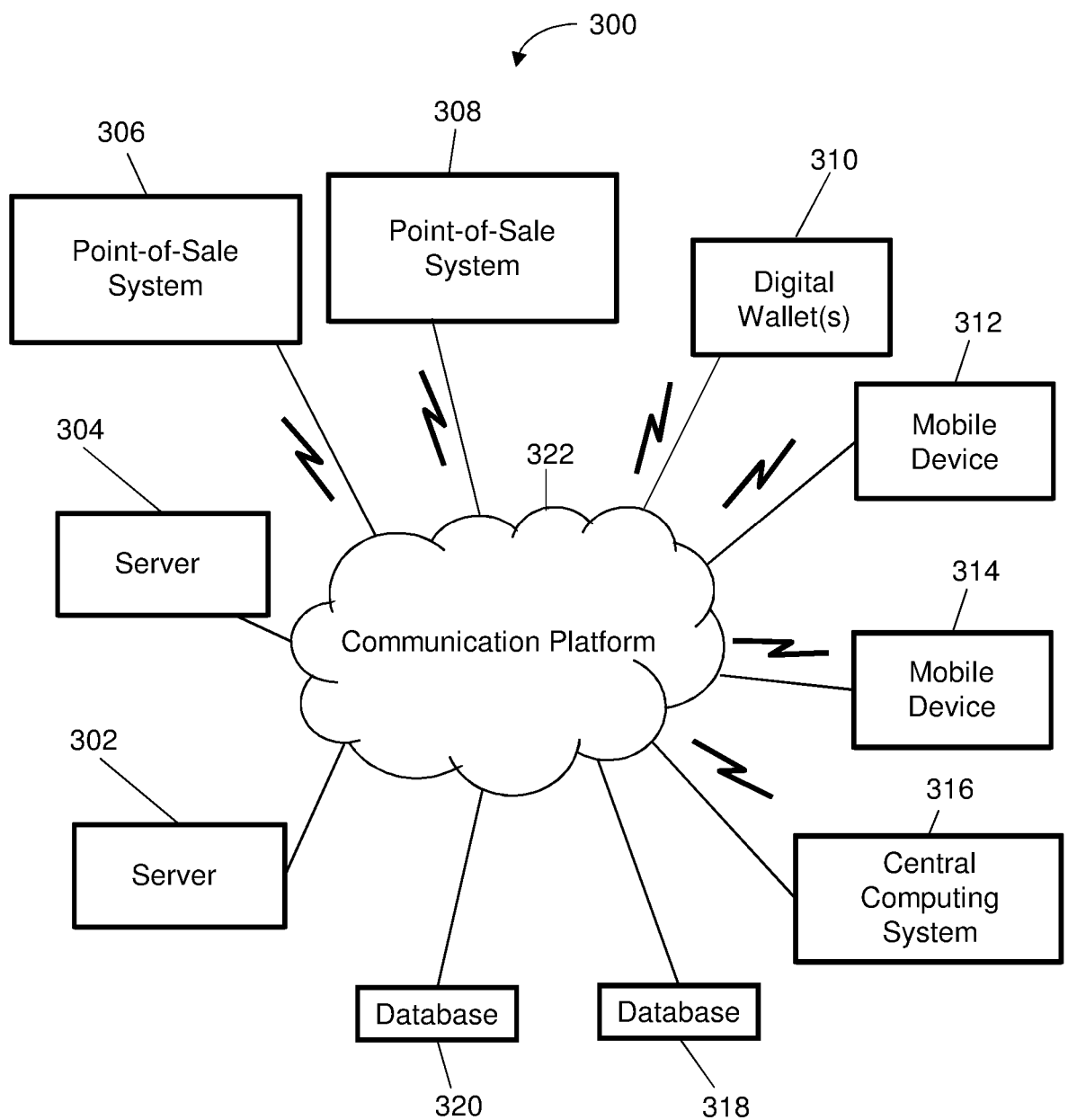
FIG. 8 is a block diagram of an exemplary distributed system environment in accordance with embodiments of the present disclosure.

FIG. 8 is a block diagram of an exemplary distributed system environment 300 for automated item assortment selection in accordance with exemplary embodiments of the present disclosure. The environment 300 can include servers 302, 304 configured to be in communication with POS systems 306, 308, digital wallet(s) 310, user mobile devices 312, 314, and central computing system 316, via a communication platform 322, which can be any network over which information can be transmitted between devices communicatively coupled to the network. For example, the communication platform 322 can be the Internet, Intranet, virtual private network (VPN), wide area network (WAN), local area network (LAN), and the like. In some embodiments, the communication platform 322 can be part of a cloud environment. The environment 300 can include repositories or databases 318, 320, which can be in communication with the servers 302, 304, as well as the POS systems 306, 308, digital wallet(s) 310, user mobile devices 312, 314, and central computing system 316, via the communications platform 322.

In exemplary embodiments, the servers 302, 304, POS systems 306, 308, digital wallet(s) 310, user mobile devices 312, 314, and central computing system 316, and databases 318, 320, can be implemented as computing devices (e.g., computing device 200). Those skilled in the art will recognize that the databases 318, 320 can be incorporated into one or more of the servers 302, 304 such that one or more of the servers 302, 304 can include databases 318, 320. In some embodiments, the databases 318, 320 can store data relating to the purchase history, the digital wallet, the digital shopping cart, the machine-readable element, combinations thereof, or the like.

Figure 9:
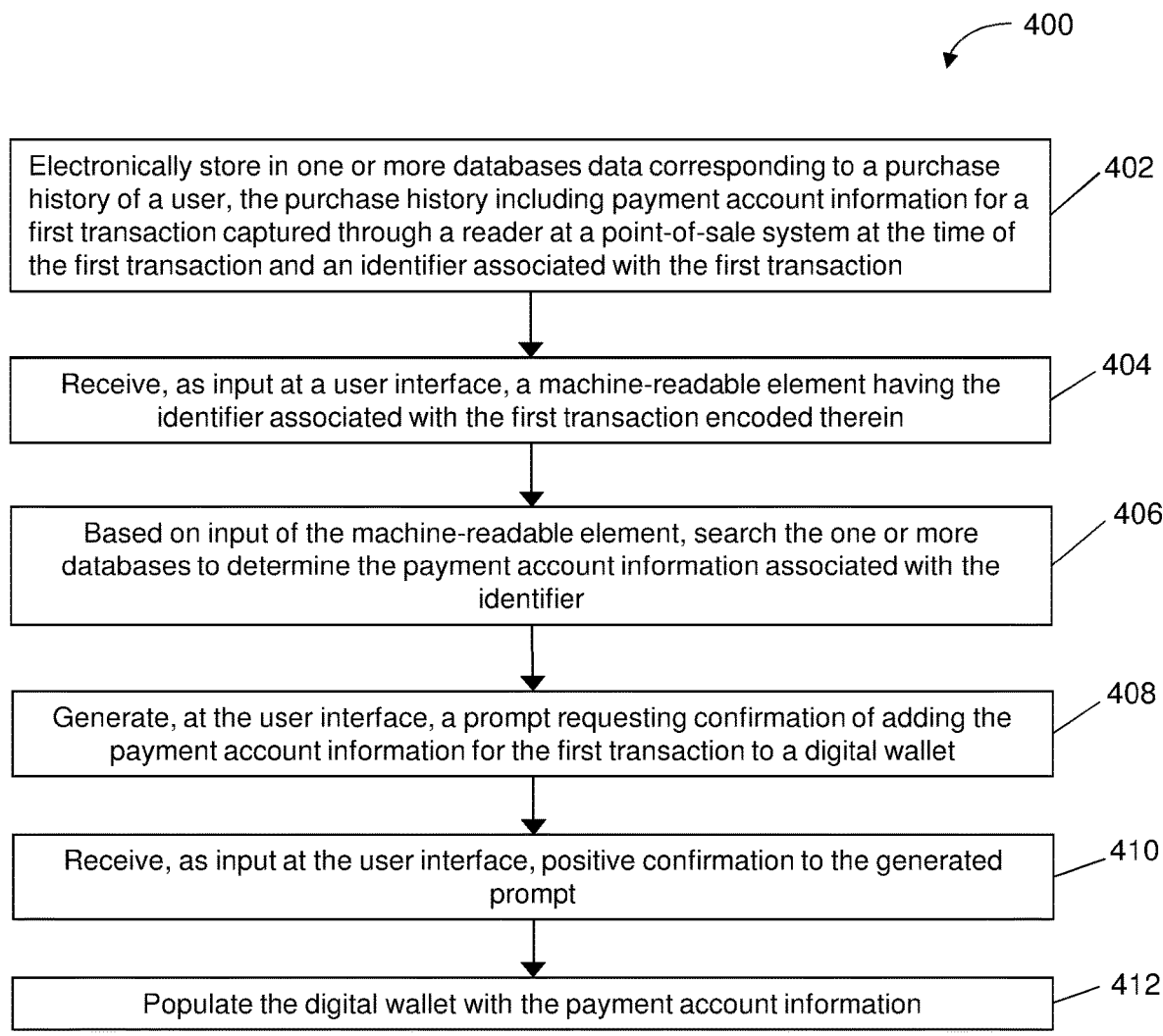
FIG. 9 is a flowchart illustrating a process implemented by an exemplary digital wallet management system in accordance with embodiments of the present disclosure.

FIG. 9 is a flowchart illustrating an exemplary process 400 as implemented by embodiments of the system 100. To begin, at step 402, data corresponding to the purchase history of a user is electronically stored in one or more databases. The purchase history includes payment account information for a first transaction captured through a reader at a POS system at the time of the first transaction, and an identifier associated with the first transaction. At step 404, a machine-readable element having the identifier associated with the first transaction encoded therein is received as input at a user interface.

At step 406, based on input of the machine-readable element, the databases are searched to determine the payment account information associated with the identifier. At step 408, a prompt requesting confirmation of adding the payment account information for the first transaction to a digital wallet is generated at the user interface. At step 410, positive confirmation to the generated prompt is received as input at the user interface. At step 412, the digital wallet is populated with the payment account information.

Thus, the exemplary system provides a convenient way to add payment methods to a digital wallet without having to manually enter the information associated with the payment method. Payment method information is automatically collected and stored during a first transaction when the user swipes the payment method at the POS terminal. The collected data can be used at a subsequent point in time to populate the data to the digital wallet of the user. The system allows the user to input the machine-readable element at any point in time after the first transaction, ensuring that the user will create or update the digital wallet when they are ready.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A system for digital wallet management, comprising:
one or more databases configured to electronically store data corresponding to a purchase history of a user; and
a computing system in communication with the one or more databases, the computing system being configured to:
process a first transaction via a reader at a point-of-sale system;
store payment account information used to make purchase during the first transaction and an identifier associated with the first transaction in the purchase history of the user in the one or more databases;
provide, to the user, a machine-readable element with a receipt of the first transaction, the machine-readable element comprising a QR code or a barcode having the identifier associated with the first transaction encoded therein;
receive, from a user interface via an application providing access to a digital wallet, the identifier in response to the application scanning or reading the machine-readable element encoding the identifier, wherein the identifier is not previously associated with the digital wallet in the one or more databases;
search the one or more databases to determine the payment account information associated with the first transaction identified by the identifier encoded in the machine-readable element;
generate, at the user interface, a prompt requesting confirmation of adding the payment account information used for the first transaction to the digital wallet;
receive, as input at the user interface, positive confirmation to the generated prompt; and
populate the digital wallet with the payment account information retrieved from the one or more databases using the identifier associated with the first transaction and encoded on the machine-readable element on the receipt.

2. The system of claim 1, wherein during the first transaction, a recording storing the payment account information is automatically created in the one or more databases.

3. The system of claim 1, wherein the payment account information includes at least one of credit card information or debit card information.

4. The system of claim 1, wherein upon receiving positive confirmation to the generated prompt, the computing system is configured to create the digital wallet, associate the digital wallet with the user, and electronically store data corresponding to the digital wallet in the one or more databases.

5. The system of claim 1, wherein during the first transaction, the computing system is configured to encrypt the payment account information with a temporary reference number that points to a first memory location at which the payment account information is stored, the temporary reference number is erased after a specified time period.

6. The system of claim 5, wherein during populating the digital wallet with the payment account information, the computing system is configured to retrieve the payment account information using the temporary reference number and to encrypt the payment account information with a permanent reference number, the permanent reference number being stored in the digital wallet in place of the payment account information.

7. The system of claim 6, wherein during a second transaction, the computing system is configured to receive payment from the digital wallet by pointing to a second memory location at which the permanent reference number is stored.

8. The system of claim 1, wherein during a second transaction, the computing system is configured to receive as input information regarding one or more items to be purchased by the user, and the computing system is configured to generate a digital shopping cart including the one or more items to be purchased.

9. The system of claim 8, wherein the computing system is configured to generate payment for the one or more items in the digital shopping cart with the payment account information in the digital wallet to complete the second transaction.

10. The system of claim 8, wherein the computing system is configured to pair with and transfer the digital shopping cart to a checkout terminal, and payment for the one or more items in the digital shopping cart is completed at the checkout terminal with the digital wallet.

11. A non-transitory computer-readable medium storing instructions for digital wallet management that are executable by a processing device of a computing system, wherein execution of the instructions by the processing device causes the processing device to:
    process a first transaction via a reader at a point-of-sale system;
    store payment account information used to make purchase during the first transaction and an identifier associated with the first transaction in a purchase history of a user in one or more databases
    wherein the identifier is a unique numeric or alphanumeric code assigned to the first transaction;
    provide, to the user, a machine-readable element with a receipt of the first transaction, the machine-readable element comprising a QR code or a barcode having the identifier associated with the first transaction encoded therein;
    receive, from a user interface via an application providing access to a digital wallet, the identifier in response to the application scanning or reading the machine-readable element encoding the identifier, wherein the identifier is not previously associated with the digital wallet in the one or more databases;
    search the one or more databases to determine the payment account information associated with the first transaction identified by the identifier encoded in the machine-readable element;
    generate, at the user interface, a prompt requesting confirmation of adding the payment account information used for the first transaction to the digital wallet;
    receive, as input at the user interface, positive confirmation to the generated prompt; and
    populate the digital wallet with the payment account information retrieved from the one or more databases using the identifier associated with the first transaction and encoded on the machine-readable element on the receipt.

12. The medium of claim 11, wherein upon receiving positive confirmation to the generated prompt, execution of the instructions by the processing device causes the processing device to create the digital wallet, associate the digital wallet with the user, and electronically store data corresponding to the digital wallet in the one or more databases.

13. The medium of claim 11, wherein during the first transaction, execution of the instructions by the processing device causes the processing device to encrypt the payment account information with a temporary reference number that points to a first memory location at which the payment account information is stored, the temporary reference number is erased after a specified time period.

14. The medium of claim 13, wherein during populating the digital wallet with the payment account information, execution of the instructions by the processing device causes the processing device to retrieve the payment account information using the temporary reference number and to encrypt the payment account information with a permanent reference number, the permanent reference number being stored in the digital wallet in place of the payment account information.

15. The medium of claim 14, wherein during a second transaction, execution of the instructions by the processing device causes the processing device to receive payment from the digital wallet by pointing to a second memory location at which the permanent reference number is stored.

16. A method of digital wallet management, comprising:
    processing a first transaction via a reader at a point-of-sale system;
    storing payment account information used to make purchase during the first transaction and an identifier associated with the first transaction in a purchase history of a user in one or more databases
    wherein the identifier is a unique numeric or alphanumeric code assigned to the first transaction;
    providing, to the user, a machine-readable element with a receipt of the first transaction, the machine-readable element comprising a QR code or a barcode having the identifier associated with the first transaction encoded therein;
    receiving, from a user interface via an application providing access to a digital wallet, the identifier in response to the application scanning or reading the machine-readable element encoding the identifier, wherein the identifier is not previously associated with the digital wallet in the one or more databases;
    searching the one or more databases to determine the payment account information associated with the first transaction identified by the identifier encoded in the machine-readable element;
    generating, at the user interface, a prompt requesting confirmation of adding the payment account information used for the first transaction to the digital wallet;
    receiving, as input at the user interface, positive confirmation to the generated prompt; and
    populating the digital wallet with the payment account information retrieved from the one or more databases using the identifier associated with the first transaction and encoded on the machine-readable element on the receipt.

* * * * *